United States Patent [19]
Taniguchi et al.

[11] Patent Number: 5,999,707
[45] Date of Patent: Dec. 7, 1999

[54] NETWORK PRINT SYSTEM FOR ALLOWING A PRINTER OR PRINTERS TO SELECT A HOST

[75] Inventors: Masahiko Taniguchi; Takefumi Nosaki, both of Kanagawa-ken, Japan

[73] Assignee: Kabushiki Kaisha Toshiba, Kawasaki, Japan

[21] Appl. No.: 08/656,477

[22] Filed: May 31, 1996

[30] Foreign Application Priority Data

Jun. 1, 1995 [JP] Japan .................................. 7-135229

[51] Int. Cl.⁶ .................................................. G06F 15/00
[52] U.S. Cl. ............................................. 395/114; 395/112
[58] Field of Search ...................................... 395/101, 106, 395/109, 112, 114, 200.3, 200.31, 200.46, 200.47, 200.56, 200.59, 200.78, 200.79; 345/1, 2, 112, 115, 326, 329, 518; 358/400, 401, 408, 500, 501; 707/500, 526; 399/8, 16

[56] References Cited

U.S. PATENT DOCUMENTS

| | | | |
|---|---|---|---|
| 5,228,118 | 7/1993 | Sasaki ...................................... | 395/112 |
| 5,537,626 | 7/1996 | Kraslavsky et al. ........................ | 710/8 |
| 5,668,936 | 9/1997 | Motooka et al. ......................... | 395/114 |
| 5,673,373 | 9/1997 | Nosaki et al. ............................ | 395/114 |
| 5,699,494 | 12/1997 | Colbert et al. ........................... | 395/114 |
| 5,727,134 | 3/1998 | Higuchi et al. .......................... | 395/101 |
| 5,768,516 | 6/1998 | Sugishima ............................... | 709/217 |
| 5,787,237 | 7/1998 | Reilly ...................................... | 395/112 |

OTHER PUBLICATIONS

Hayes, The printers tulu bacu. Byte Dec. 1993, pp. 104–106, 108 and 110.

*Primary Examiner*—Dov Popovici
*Assistant Examiner*—Gabriel I. Garcia
*Attorney, Agent, or Firm*—Foley & Lardner

[57] ABSTRACT

A network print system includes a host having the function to generate print data, a printer that processes printing on the basis of a specified print data, and a communication network that connect the printer and the host so that they can communicate with each other. The printer of the network print system carries out send request of desired print data to the host, and receives print data corresponding to the send request, and thereby executes print processing in accordance with the print data. Further, the host includes a memory to store the print data, and sends the print data stored in the memory to the printer that has carried out a send request of print data when the send request of the print data is carried out in the printer through the communication network.

4 Claims, 11 Drawing Sheets

| PRINT JOB MANAGEMENT DATA |
|---|
| JOB ID<br>JOB GENERATOR ID<br>JOB EVENT DATE AND TIME<br>JOB RETAIN COMPUTER ID<br>JOB REPRODUCTION NUMBER<br><br>JOB OWNERSHIP<br>PASSWORD<br>JOB EFFECTIVE TERM<br><br>PRINT CONTENT INDEX |
| PRINT CONTENT DATA |
| CONTROL DATA OF PRINTER CONTENT DATA |

PLEASE INPUT
YOUR PASSWORD

PLEASE INPUT
YOUR PASSWORD

NETWORK PRINT SYSTEM FOR ALLOWING A PRINTER OR PRINTERS TO SELECT A HOST

BACKGROUND OF THE INVENTION

1. Field of the Invention

The present invention relates to a network print system to output images including documents and the like prepared by a computer connected on a network such as LAN or so by use of an optional printer connected on the same network.

2. Description of the Related Art

Recently there are many network print systems to output images made by computers in a configuration of a network environment such as LAN involving plural computers and plural printers.

In the network print systems in the prior art, at the event of image data created (a print job) by a certain computer so as to be printed by a printer, the print job was immediately sent to the printer designated on the network or a print server to store and control the print job.

In each printer or print server, the received print job is stored initially into a First-In First-Out (FIFO) print queue consisting of a buffer memory and the like, and a print job that has come first into the print queue is printed first.

In this manner, in the print job management methods by the conventional network print systems, at the event of a print job on a computer, the print job is sent to a printer or a print server set on the network as print data. Accordingly, there were many cases where many print jobs were accumulated in a certain printer or print server designated on the network, even though print queues of other printers were empty.

Furthermore, in each printer or print server, print jobs were executed in the sequence of coming into the print queue, therefore, even a print job of one sheet had to wait in the case when another print job of numerous sheets had come into the print queue of the printer just before it. Namely, printing was executed always by a predetermined printer, so even when there were other printers ready for printing, a user who wanted to print out only one sheet had to wait for a long time, which was one of the negative effects in the prior art.

Still further, since printing was executed in the sequence of print jobs coming into a print queue of the printer or print server, when plural users utilized a single printer, they may have left their own printed matters in that printer. Namely, the information of printed matters may have been accessed by other persons, as a result, it was difficult to keep secrecy, which was another problem in the prior art.

Also, print jobs were controlled at the printer side, and the contents of the print queue were printed at once, therefore, if printed matters were output by mistake, unnecessary printed matters were output automatically. Moreover, it was very difficult to completely delete a print job created by mistake from the computer side, which was another problem in the prior art.

And further, when plural copies of an identical document were necessary, for instance, in a conference or so, in the conventional network print system, it was necessary to copy the printed matter output by the printer by use of a photo-electric copying machine or to execute the same print job many times.

SUMMARY OF THE INVENTION

Accordingly, the object of the present invention is to provide a network print system that enables to reduce the print waiting time, to eliminate printing mistakes, to enhance the secrecy function of printed information in a shared printer, and further for designated plural people to obtain an identical document from optional printers in a network such as LAN and so on.

According to the present invention, provided is a network print system having a host that has a function to generate print data, a printer that carries out printing on the basis of specified print data, and a communication network that connects the printer and the host so that the printer and the host communicate with each other, wherein printing is executed by the printer on the basis of print data transmitted from the host, the network print system comprising the printer including: means for requesting to the host to be transmitted a desired print data from the host to the printer; and means for printing a document based on the desired print data sent from the host; the host including: means for storing the print data; and means for transmitting the print data stored in the storing means to the printer via the communication network in response to the request by the requesting means.

Other objects and advantages of the present invention will become apparent from the detailed description to follow taken in conjunction with the appended claims.

DETAILED DESCRIPTION OF THE PREFERRED EMBODIMENTS

The invention is described in detail by reference to the following referential examples and preferred embodiments wherein.

Figure 1:
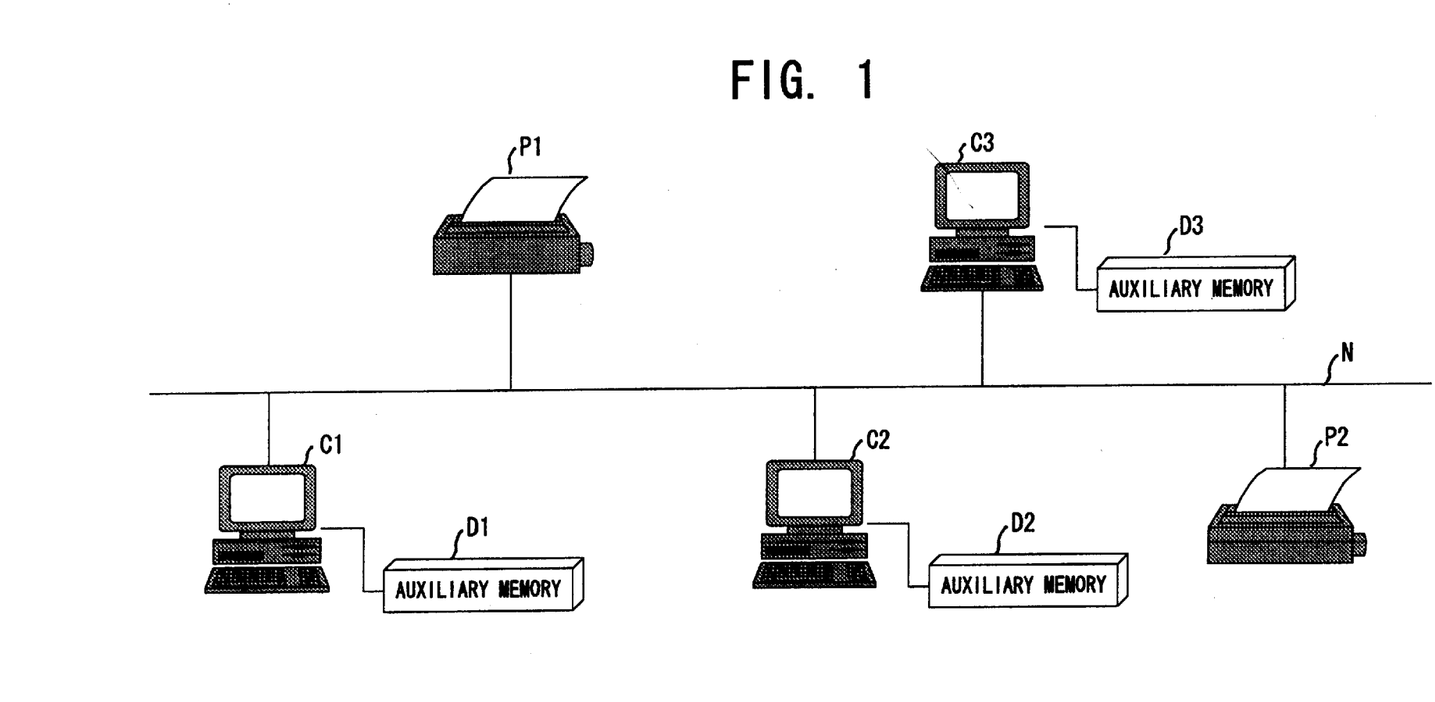
FIG. 1 is a schematic diagram showing a configuration of network print system of one embodiment of the present invention.

FIG. 1 is a schematic diagram showing a configuration of network print system of one embodiment of the present invention. In FIG. 1, plural computers C1, C2, and C3 as host, and plural printers P1 and P2 are connected with one another through communication network N. This network print system is so designed that users 1, 2, and 3 having respective identification information (ID or so) can use the system.

Each of computers C1, C2 and C3 prepares documents and so on by use of various application software. Computers C1, C2 and C3 are connected to auxiliary memories D1, D2 and D3 respectively. Especially, image data (hereinafter referred to as print data or print content data) prepared for the purpose of printing by either of printer P1 or P2 are stored into these auxiliary memories D1, D2 and D3.

All the computers C1, C2 and C3, and printers P1 and P2 connected on the network N execute the management processing of print jobs that have occurred at each of the computers C1, C2 and C3, under the control of CPUs arranged therein respectively, and in accordance with a print job management program stored in memories arranged therein respectively, through mutual communications among computers C1, C2 and C3, and printers P1 and P2.

Each of the printers P1 and P2 has a display means such as a display unit, and input means such as a mouse, keyboard and the like to select specified items and to enter a password or so on the basis of displayed contents.

Herein, when documents are prepared by the computers C1, C2 and C3 for the purpose of printing by either the printer P1 or P2, and the documents are stored into the auxiliary memories D1, D2 and D3 respectively, which is called "Event of Print Jobs".

Next, the data configuration of print jobs to be stored into the auxiliary memories D1, D2 and D3 is explained hereinafter in reference to FIG. 2.

A print job includes print job management data and print content data.

And further, the print job management data includes "Job ID", "Job Generator ID", "Job Event Date and Time", "Job Effective Term", "Job Retain Computer ID", "Job Ownership", "Job Reproduction Number", "Password", and "Print Content Index".

The print content data includes printer management data relating printed matter, and content data such as documents prepared by the computers C1, C2 and C3 for the purpose of printing out.

"Job ID" is added at the event of print job to identify it, and is peculiar to each print job; therefore, it cannot be changed.

"Job Generator ID" is added at the event of print job to identify the generator of the print job. This "Job Generator ID" is peculiar to each print job; therefore, it cannot be changed.

"Job Event Date and Time" shows the date and time of the event of print job, and once added, it cannot be changed.

"Job Retain Computer ID" shows the identification data (ID) of a computer where the print job is generated at the event of print job, and is used to know in which computer's auxiliary memory a print job is retained. This "Job Retain Computer ID" cannot be changed too.

"Job Ownership" shows who the owner of a print job is, and normally, the ID or name of print job generator is recorded at the event of print job. "Job Ownership" may be changed by use of a print job management program. Namely, a single print job may be owned by plural users by adding other person's ID or name.

"Job Reproduction Number" shows the number of copies of printed matter that may be obtained from one print job. "Job Reproduction Number" corresponds to the number of job owners; therefore, it cannot be rewritten.

"Password" is used to judge whether the owner of print job preset as "Job Ownership" is identical with executor of printing or not. This "Password" may be set and changed by its print job generator by use of the print job management program.

"Job Effective Term" shows the effective term of print job on the network N, i.e., the term when printing is available. The purpose of defining this job effective term is to prevent the auxiliary memories D1, D2 and D3 from becoming full of jobs, and also to keep secrecy. This setting is made by use of the print job management program.

"Print Content Index" allows one to add a simple explanation for users to identify what the printed matter obtained from the print job is. "Print Content Index" may be described by use of the print job management program.

Then, the outline of the functions of the print job management program is explained hereinafter in reference to FIG. 3. The print job management program is to manage print jobs by use of the above print job management data.

The print job management job regards a print job as completed when "Job Reproduction Number" becomes "0" or when "Job Effective Term" passes. However, the print job completion by "Job Effective Term" passing has priority over the print job completion by "Job Reproduction Number" becoming "0". Also, a print job generator may delete a print job of its own generating at any time.

The print job management program is so designed as to display the detailed data of print jobs of the computers C1, C2 and C3 on which the print job management program is running on display units of the computers C1, C2 and C3. It also displays the remaining memory capacities of the auxiliary memories D1, D2 and D3 in the computers C1, C2 and C3, a list of printers that can output desired print data, and also it collates password when a print job execution request is sent from either of the printer P1 or P2 through the communication network N, and also informs a user of a the event of print job addressed to that user.

Figure 3:
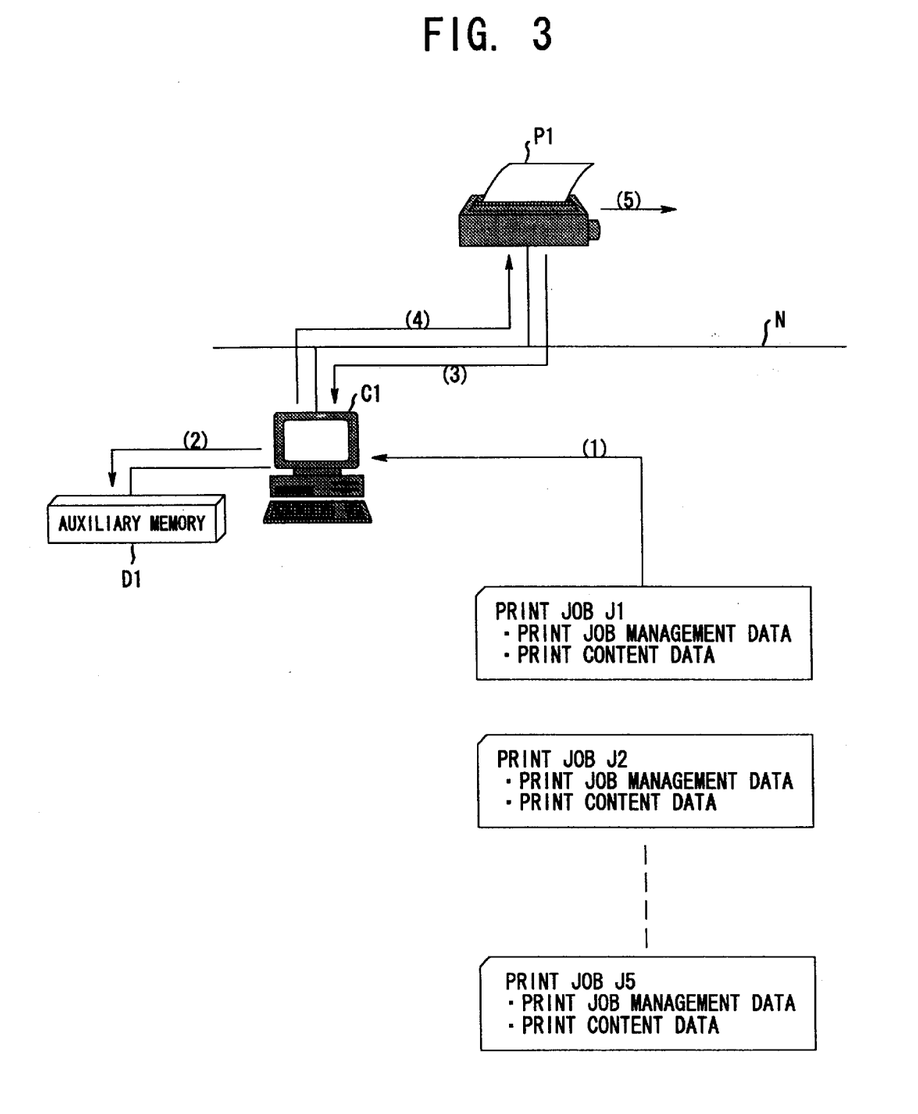
FIG. 3 is a schematic diagram to explain the outline of the functions of print job management program.

First, the user 1 prepares documents or so on at the computer C1, to generate print job J1 (arrow (1) in FIG. 3). At this moment, the user 1 may enter the items of "Job Ownership" and "Password" of the print job management data, give the ownership of that print job to other users than the user 1, and enter the items of "Job Effective term", "Print Content Index" and so on.

Figure 2:
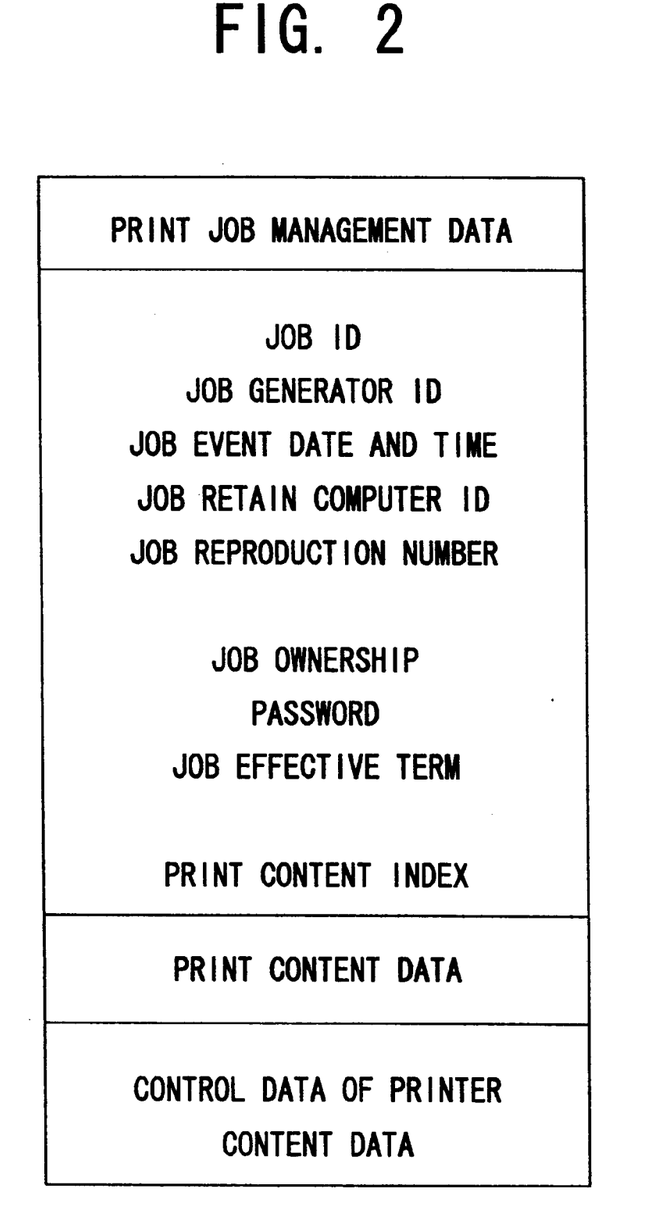
FIG. 2 is a table to explain the data structure of print job to be stored in auxiliary memory.

The print job J1 generated in this manner has a structure shown in FIG. 2, and the generated print job J1 is stored under control of the print job management program.

Next, the print job J1 is not immediately sent to printers on the network N, but is stored into the auxiliary memory D1 of the computer C1 where that print job J1 has been generated (arrow (2) in FIG. 3).

At this moment, if the data amount of the print job J1 is larger than the remaining memory capacity of the auxiliary memory D1 of the computer C1, then the print job management program gives a warning that the auxiliary memory capacity is low to the user 1 who has generated the print job J1, and makes the generated print job J1 invalid.

In this manner, the control of the memory capacities of the auxiliary memories D1, D2 and D3 by the print job management program enables to generate many print jobs by the same computers C1, C2 and C3 and to keep plural print jobs J1 through J5 in their respective auxiliary memories D1, D2 and D3 so long as the memory capacities of auxiliary memories D1, D2 and D3 permit.

When print execution is instructed from, for example, the printer P1 connected to the communication network N (arrow (3) in FIG. 3), the computer C1 sends out the print job J1 (arrow (4) in FIG. 3) for the first time, and the printer P1 receives it and starts printing (arrow (5) in FIG. 3).

The print job management data of the print job J1 should be changed only at the computer C1 where the print job J1 is generated, and only by the generator of the print job J1, that is, the user 1.

When to change the contents of the print job management data, for example, the generator of the print job J1, at the computer C1 where the print job J1 is generated, starts the print job management program, and enters desired data under the control of CPU in accordance with the program and by use of a keyboard, mouse, or the like. On the basis of the entered data, the contents of the print job management data stored in the auxiliary memory D1 are rewritten.

The print job management program does not adopt the print job queuing method as seen in the conventional printer server, but can send print jobs in response to the print job send request from the communication network N irrespective of the occurrence sequence of print jobs.

In this way, the print job J1 is kept in the auxiliary memory D1 and controlled by the computer C1 by use of the print job management program, so the print job J1 may be printed out by both the printer P1 and P2 connected to the communication network N, and user may execute a printing job by either of the printer P1 or P2 which is not busy and ready for printing. As a consequence, since the user selects a printer, which is not busy, waiting time may be reduced.

The print job J1 generated at the computer C1 is kept in the auxiliary memory D1 of the computer C1, and the generator of the print job J1 may delete the print job J1 at any time at necessity; therefore, erroneous output to the printer may be prevented.

Next, the circuit configuration of the printers P1 and P2 employed in the network print system under the present invention is explained hereinafter in reference to FIG. 4.

The printers P1 and P2 are connected via a network interface circuit 10 to the network N. The network interface circuit 10 is connected to a CPU 12 via a system bus S1. A ROM 14 containing the control program, a RAM 16 that runs the control program contained in the ROM 14, and an NVRAM 18 that contains list data and the like of the computers C1, C2, and C3 on the network N are connected to the CPU 12 via the system bus S1. Further, via the system bus S1, a display 20 that includes a liquid crystal panel and so on, an input device 22 that includes a keyboard, mouse or touch panel for a user to enter data, a card reader 24, a dual port RAM 26 that carries out status communications with a printer CPU 5a (FIG. 5) to control the printer, are connected to the CPU 12.

The network interface circuit 10 and a page memory 28 are connected with each other through a high speed image bus S2. The page memory 28 is connected via the system bus S1 to the CPU 12 too. Further, this page memory 28 is connected via the high speed image bus S3 to a modulator circuit 5w shown in FIG. 5.

Figure 5:
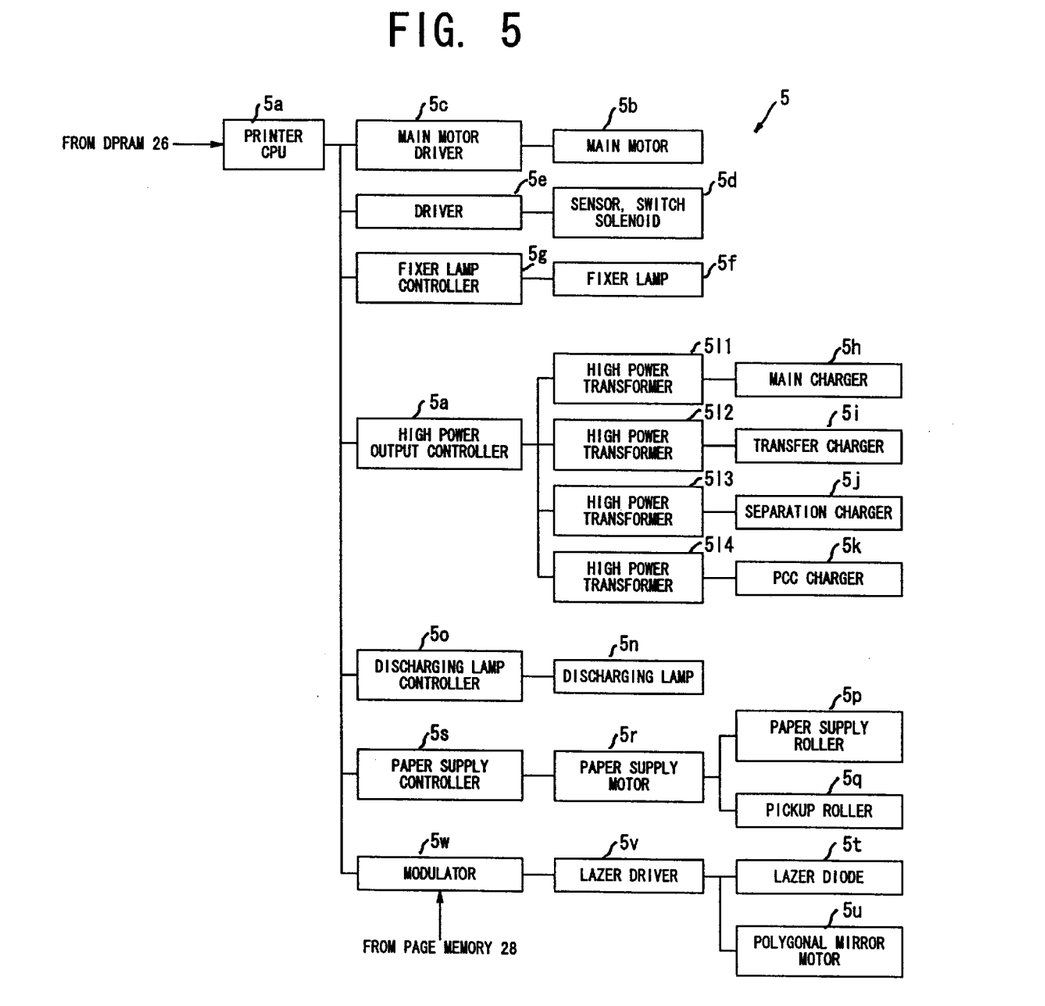
FIG. 5 is a block diagram showing a hardware configuration of a print mechanism portion of the printer illustrated in FIG. 4.

In reference to FIG. 5, the hardware configuration of the printer mechanism portion 5 of the printers P1 and P2 is explained hereinafter. To a printer CPU 5a of the printer mechanism portion 5, a main motor driver 5c to drive a main motor 5b, a driver 5e to drive and control a sensor, switch, solenoid and the like, and a fixer lamp controller 5g to control a fixer lamp 5f are connected respectively. A main charger 5h, a transfer charger 5i, a separation charger 5j and a charge remover 5k are connected to a high power output controller 5m via high power transformers 511, 512, 513 and 514 respectively, and this high power output controller 5m is connected to the printer CPU 5a. Further to the printer CPU 5a, a discharging lamp controller 5o to control a discharging lamp 5n, and a paper supply controller 5s to control a paper supply motor 5r are connected. Connected to the paper supply motor 5r are a paper supply roller 5p and a pickup roller 5q.

A laser diode 5t and a polygon mirror motor 5u are connected to a laser driver 5v, which is connected to the printer CPU 5a via a modulator 5w.

Figure 4:
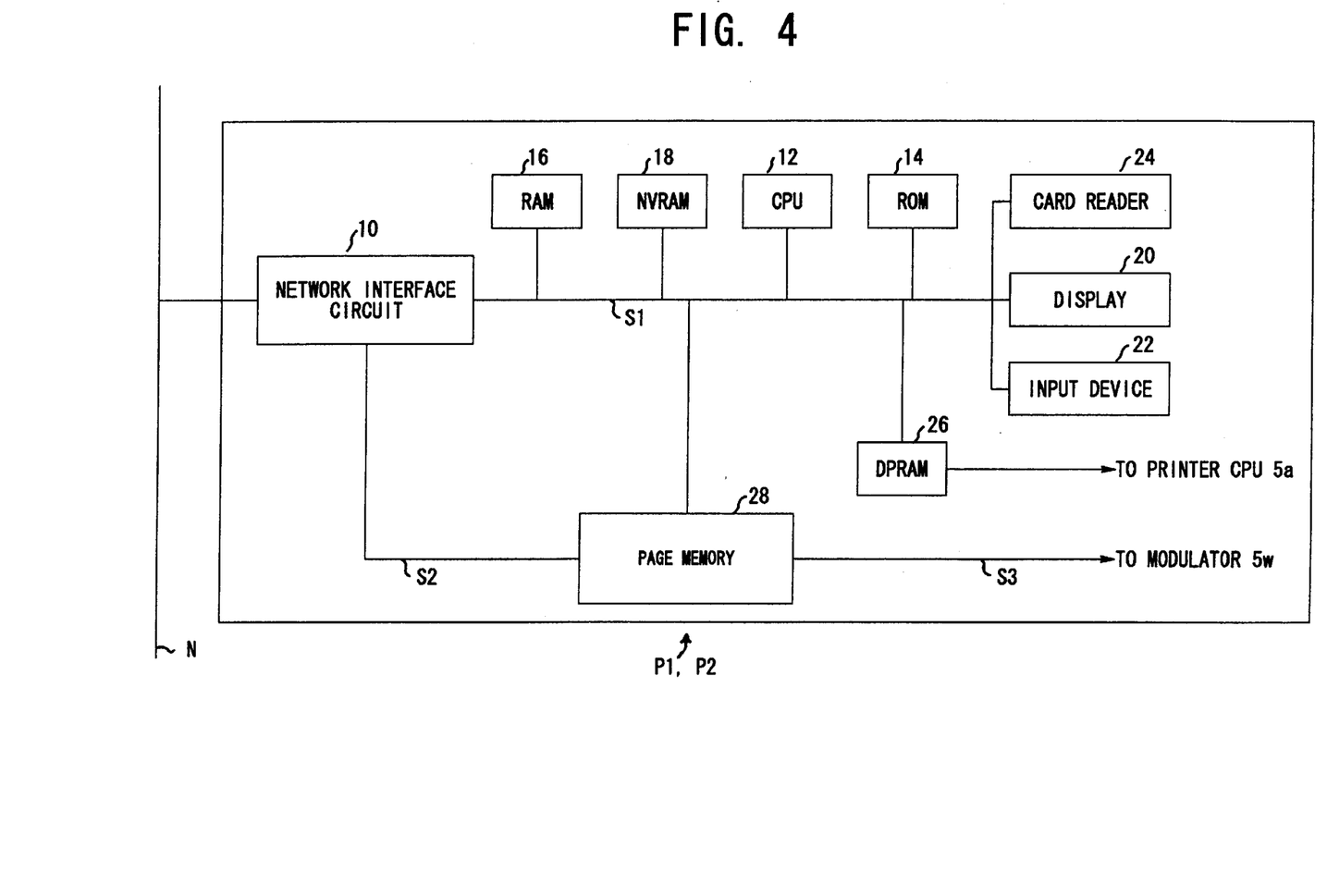
FIG. 4 is a block diagram showing a circuit configuration of a printer to be used in the network print system of the present invention.

Image data that is sent from the page memory 28 shown in FIG. 4 via the high speed image bus S3 is input to the modulator 5w. On the basis of the image data input to the modulator 5w, the image is printed onto a specified paper sheet by the control of the printer CPU 5a.

Then, in reference to the flowchart shown in FIG. 6, operation processes by the print job management program in the network print system in FIG. 1 are explained hereinafter. Herein, especially explained is the case when the ownership of a print job is owned by the generator of the print job concerned.

Figure 6:
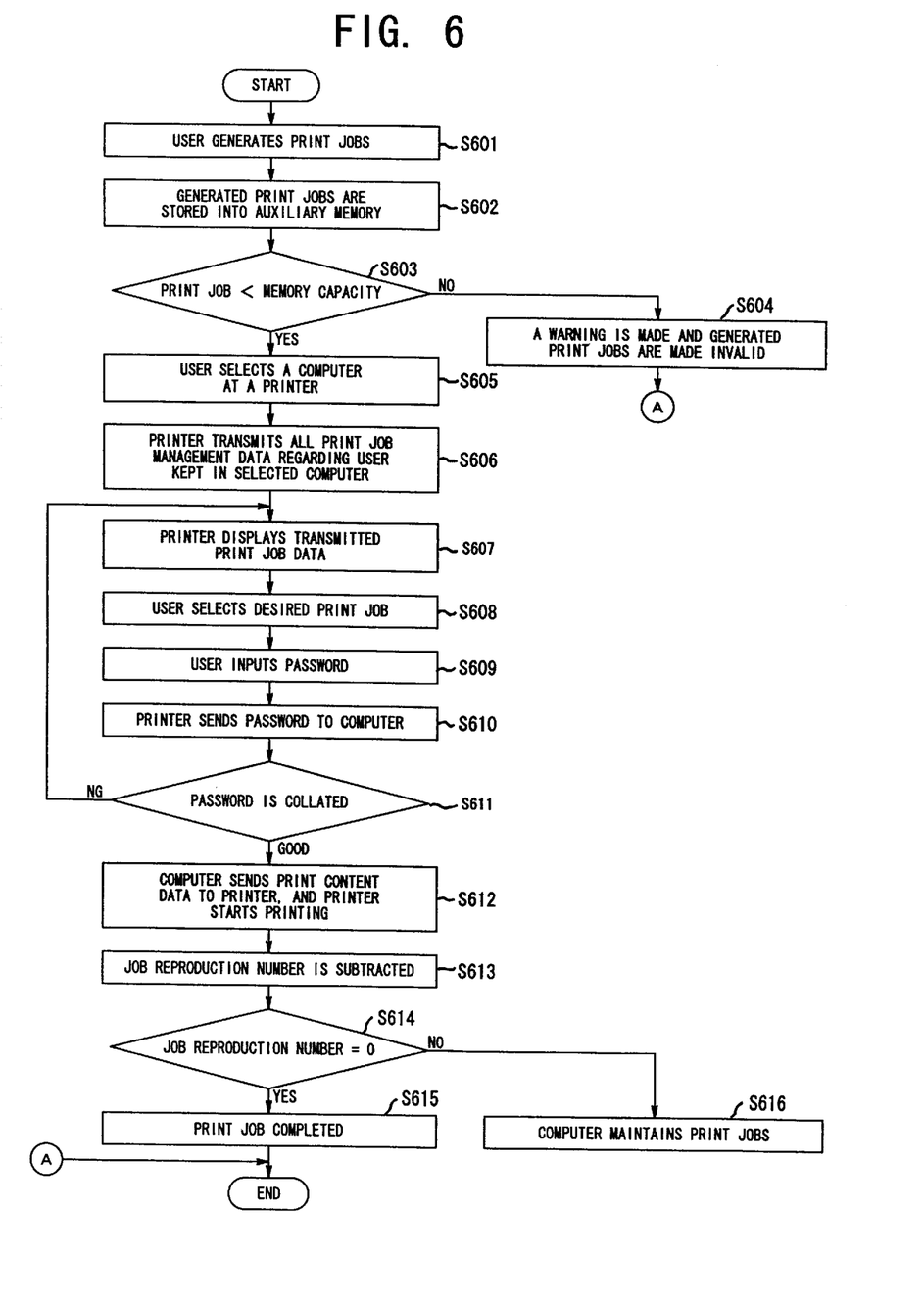
FIG. 6 is a flow chart to explain the operation processes by print job management program in the network print system in FIG. 1.

In FIG. 6, in the step S601, a user generates some print jobs (print job J1 through print job J5) by the computer C1.

In the step S602, generated print jobs J1 through J5 are stored into the auxiliary memory D1 of the computer C1 where they have been generated, as mentioned previously. That is, when plural documents are created for the purpose of being printed, they are stored into the auxiliary memory D1 as the print content data of print jobs J1 through J5.

And, herein, the ownership of the print jobs J1 through J5 is owned by only the user who has generated the print jobs concerned, therefore, there is no need to change the "Job Owner ID" and "Password" to be stored in the auxiliary memory D1 per each of print jobs J1 to J5 as print management data. As a corollary, the "Job Owner ID" and "Password" to be stored in the auxiliary memory D1 per each of print jobs J1 to J5 as print management data are those of only the user concerned. Further, at necessity, "Job Effective term", "Print Content Index" and so on may be entered as print job management data, and these are stored into the auxiliary memory D1 per each of print jobs J1 through J5.

When the print jobs J1 through J5 are stored into the auxiliary memory D1, the memory capacity of the auxiliary memory D1 at the moment is compared with the data amount of the print jobs J1 to J5 (in the step S603). If the memory capacity of the auxiliary memory D1 is larger, the print jobs are stored into the auxiliary memory D1, and the process goes to the step S605. On the contrary, if the memory capacity of the auxiliary memory D1 is too low, the process goes to the step S604, where a warning that the memory capacity of the auxiliary memory D1 is low is made to the user who has generated the print jobs, and the generated print jobs are made invalid.

In the step S605, the user who has generated print jobs goes to, for example, the printer P1 connected on the same network as the computer C1 keeping the print jobs, and according to the contents displayed on the display 20 on the printer P1, the user selects the computer C1 by the mouse or so of the input device 22, and the process goes to the step S606.

In the step S606, when the computer C1 is selected, the printer P1 inquires about all the print job management data kept in the selected computer C1 via the communication network. At this moment, the print job management data to be transmitted on the communication network N are "Job ID", "Job Generator ID", "Job Event Date and Time", "Job Effective Term", "Job Retain Computer ID", "Job Ownership", "Job Reproduction Number", and "Print Content Index". At least "Password" should not be sent to the printer P1.

Next, in the step S607, when the printer P1 receives the print job management data of the print jobs J1 to J5 except a password that the computer C1 keeps from the computer C1, the printer P1 displays a part of their contents on its display 20, and the process goes to the step S608.

In the step S608, the user selects a desired print job (for example, print job J1) by use of the mouse or so of the input device 22 of the printer P1, and the process goes to the step S609.

In the step S609, the printer P1 prompts the user to enter his or her password by displaying a message on its display 20, and the process goes to the next step S610.

In the step S610, when user enters his or her password from the keyboard or so of the input device 22 of the printer P1, the password is sent via the communication network N to the computer C1 selected previously, and the process goes to the next step S611.

In the step S611, the computer C1 compares the password sent from the printer P1 and the password of the owner of the selected print job J1, i.e., the user who has generated the job, and thereby judges whether the user who request print execution is the correct owner of the print job J1 or not.

If both the passwords are identical with each other, the process goes to the step S612, and the computer C1 immediately sends out the print content data of the print job J1 requested for printing to the printer P1 with receive request. The printer P1 receives the print content data of the print job J1, and executes printing accordingly.

At the normal completion of print execution of the print job J1 in the printer P1, the notice to that effect is made from the printer P1 via the communication network N to the computer C1, and the process goes to the next step S613. In the step S613, the computer C1 subtracts "1" from the value of "Job Reproduction Number" of the print job management data of the print job J1, and the process goes to the next step S614.

In the step S614, when the value of "Job Reproduction Number" is "0", the process goes to the step S615, and the print job J1 is regarded to be completed, and is deleted from the auxiliary memory D1 of the computer C1. On the other hand, when the value of "Job Reproduction Number" is not "0", the process goes to the step S616, and the print job J1 is kept in the auxiliary memory D1, and may be printed from either the printer P1 or P2 until the "Effective Term" of the print job management data passes, or until the print job J1 is deleted by the generator of the print job J1.

In this manner, the print job J1 may be accessed and printed from either the printer P1 or P2 on the communication network N to which the computer C1 keeping the print job J1 is connected; thereby, user's print waiting time is reduced.

What is explained in reference to FIG. 6 is also effective in the case where there are plural users on the network N, who generates print jobs respectively, and execute printing from optional printers on the network N. In this case, a password is used to confirm whether the owner of a certain print job corresponds to the print executor or not, so even if the printers P1 and P2 are shared by plural users, the function to keep secrecy of printed matters is improved more than that in the conventional network print systems. And further, confusion in the network is avoided by not sending all the contents of print job at one time but sending only the print job management data.

Then, in reference to FIG. 7 and FIG. 8, other operation processes in the network print system in FIG. 1 by the print job management program are explained hereinafter. Herein, explanation is made about the case where the ownership of a print job is given to other plural users than the generator of the print job.

Figure 7:
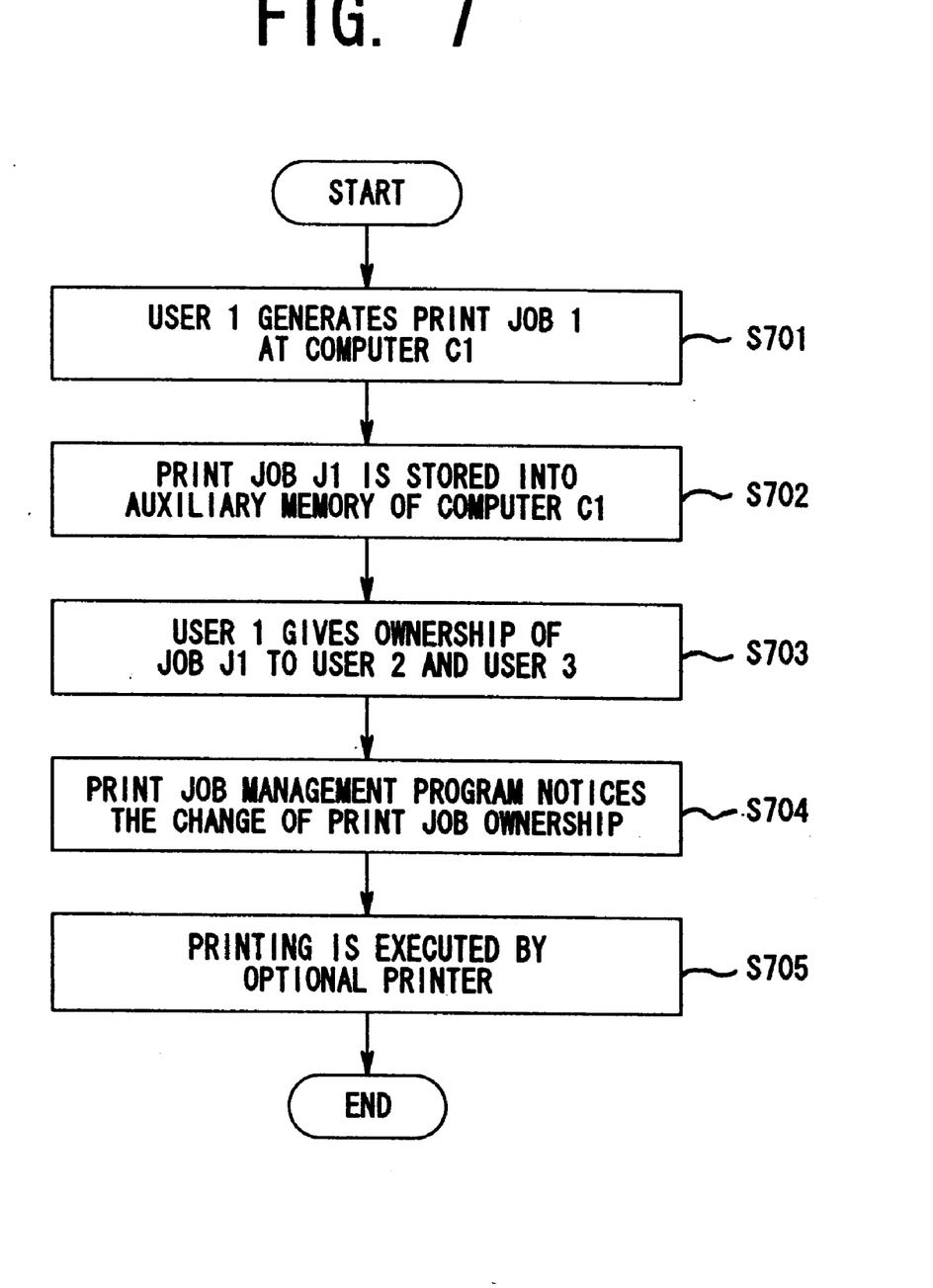
FIG. 7 is a flow chart to explain other operation processes by print job management program in the network print system in FIG. 1.

FIG. 7 is a flow chart to explain the operation processes by print job management program in the case where the ownership of a print job is given to other plural users. FIG. 8 is a schematic diagram to explain the data flow in the network print system in correspondence to the flow chart in FIG. 7.

Figure 8:
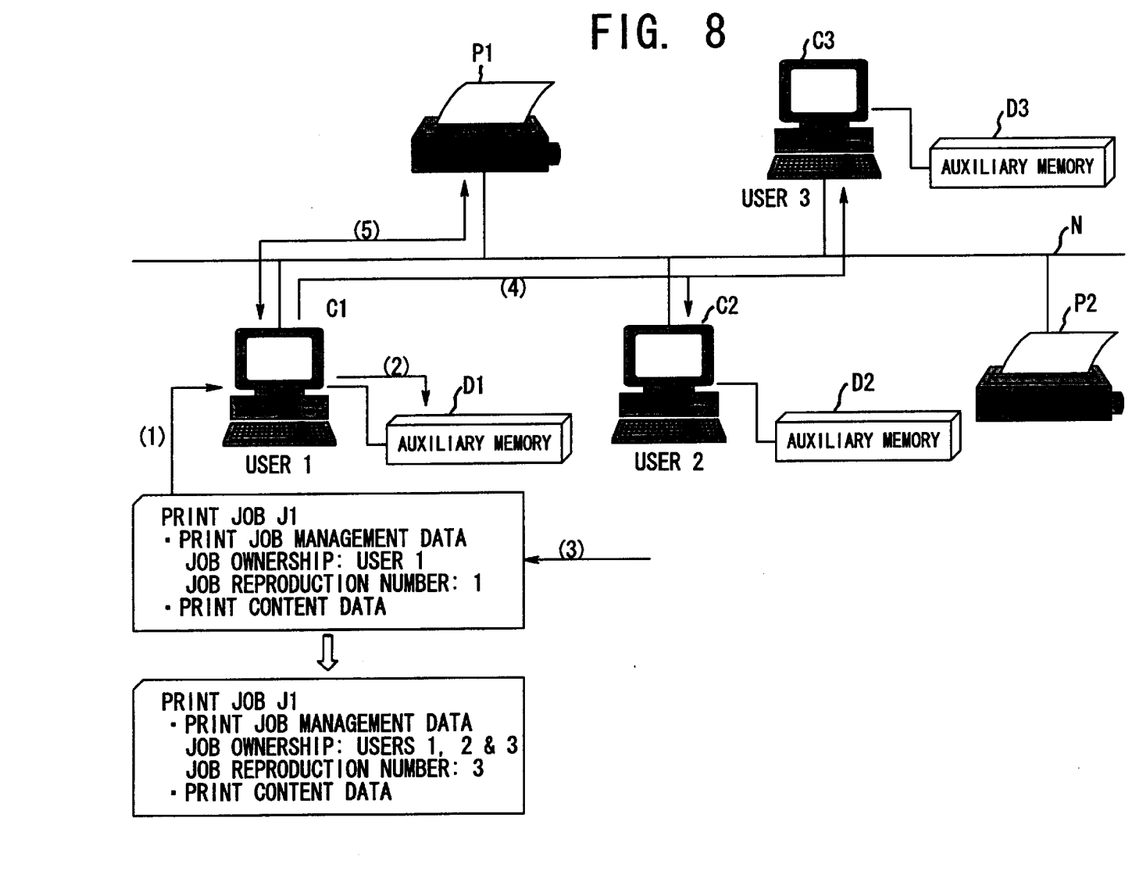
FIG. 8 is a schematic diagram to explain the data flow in the network print system in correspondence to the flow chart in FIG. 6.

In FIG. 7, in the step S701, the user 1 generates print job J1 by the computer C1 (arrow (1) in FIG. 8).

In the step S702, the generated print job J1 is stored into the auxiliary memory D1 of the computer C1 (arrow (2) in FIG. 8). That is, when a document or so is created for the purpose of being printed, it is stored into the auxiliary memory D1 as the print content data of print job J1. At the same time, the prescribed print job management data is also stored into the auxiliary memory D1.

Then, the processes of the steps S603 through S604 in FIG. 6 are carried out, and the process goes to the step S703 in FIG. 7.

Now here, it is supposed that the user 1 has to deliver the printed matter that is printed on the basis of the print job 1 to the users 2 and 3.

In this case, the user 1, at the step S703, gives its job ownership to the users 2 and 3 by use of the print job management program (arrow (3) in FIG. 8). Namely, the user 1 enters the respective IDs and a common password of the users 2 and 3 from the input device such as a keyboard or so of the computer C1, and adds them to "Job Ownership" and "Password" of the print job management data of the print job J1. The users 2 and 3 may use the common password. That is, the common password is given to the user 2 and 3 who execute common project. As a result, "Job Reproduction Number" of the print job management data of the print job J1 is also updated. Here, job ownership is given to the users 1, 2 and 3; therefore, "Job Reproduction Number" becomes "3".

At this moment, the print job J1 is owned by the users 1, 2 and 3. Namely, the users 2 and 3 as well as user 1 may execute printing of the print job J1 from optional printers (printer P1 and printer P2) on the network N in the same manner mentioned already.

Next, the process goes to the step S704, the user 1 gives the ownership of the users 2 and 3 to the print job j1, and the print job management program informs that the ownership of print job J1 has been changed to the users 2 and 3 (arrow (4) in FIG. 8).

This notification may be made by another method, such as by e-mail.

When the users 2 and 3 acknowledge the event of the print job J1 addressed to them by the above notification received by the computers C2 and C3 respectively, then the process goes to the step S705.

The processing operation in the step S705 are the same as the explanation in the steps S605 through S616 in FIG. 6. Namely, each of the users 1, 2 and 3 accesses from an optional printer on the network (either of printer P1 or P2) to the computers C1 keeping the print job J1, collates the password, then executes printing operation (arrow (5) in FIG. 8).

Namely, for example, when the user 2 executes printing operation, the user 2 goes to the printer P1 in the step S605, and selects the computer C1 via the input device 22. In the step S606, the printer P1 inquires about all the print job management data kept in the selected computer C1 via the network N, and the process goes to the step S607, where the printer P1 receives the print job management data of the print job kept by the computer C1 that is sent from the computer C1, and displays them on its display unit. Next, user 2 goes to the step S608, where user 2 selects the print job J1 from the printer P1, and in the step S609, the printer P1 prompts the user 2 to enter the password.

And in the step S610, when the user 2 enters the password from the keyboard or so of the input device 22 of the printer P1, the password is sent to the computer C1 selected previously, and the process goes to the next step S611. In the step S611, the printer C1 compares the password sent from the printer P1 and the password stored as the print job management data of the selected print job J1, and thereby judges whether the user 2 who requests print execution is the correct owner of the print job J1 or not. If both the passwords are identical with each other, the process goes to the step S612, and the computer C1 immediately sends out the print content data of the print job J1 requested for printing to the printer P1 with receive request. And the printer P1 receives the print content data of the print job J1, and executes printing operation accordingly.

As mention previously, when the user 1 generates the print job J1, "Job Reproduction Number" shows "1", but when the user 1 gives the ownership of the print job J1 to the users 2 and 3, "Job Reproduction Number" of the print job J1 becomes "3". This number corresponds to the number of job owners. Here, it is supposed that the user 2 has executed printing of the print job J1 from the printer P1 in accordance with the above procedures. At the completion of print execution, the value of "Job Reproduction Number" is automatically subtracted, and becomes "2". In this case, the job reproduction number is not "0", therefore, the print job J1 is not regarded as to be completed. Further, when remaining users 1 and 3 carry out printing of the print job J1 in succession, the job reproduction number becomes "0", and the print job is completed, then the print job J1 is deleted from the auxiliary memory D1 of the computer C1.

In this manner mentioned above, under the control in accordance with the print job management program in the network print system of the present embodiment, the user 1 changes "Job Ownership" and "Password" of the print job management data about the print job J1 that has occurred in the computer C1. By this change, the ownership of the print job J1 is given also to plural users 2 and 3, and is stored in the auxiliary memory D1 of the computer C1. On the other hand, the print job management program gives notice of the occurrence of the print job J1 to the users 2 and 3, and the users 2 and 3 select the computer C1 from an optional printer (for example, the printer P1), and collate the password when they access the print job J1. By this collation, user 2 and user 3 judge that the user is the correct owner of the print job J1, then read the content data of the print job J1 from the auxiliary memory D1 of the computer C1. By sending the read content data to the printer P1 to execute printing operation, these plural users can keep the secrecy of printed matter and obtain printed matter of the identical content from an optional printer. And further, user's print waiting time may be reduced, and mistakes in printing may be eliminated.

Also, the control of the reproduction number by "Job Reproduction Number" of the print job management data prevents inexhaustible print execution.

Furthermore, when the "Job Effective Term" of the print job management data set for the occurred print job J1 passes, even if none of all the job owners (users 1, 2 and 3) is executing print operation, the print job J1 is regarded to be stale, and the print job J1 is deleted from the auxiliary memory D1 of the computer C1. Thereby, the print job J1 that has become unnecessary without being referred to may be deleted easily from the auxiliary memory D1 therefore, memory capacity may be used efficiently.

In the next place, in reference to FIGS. 9 and 10, other operation processes in the network print system in FIG. 1 by the print job management program are explained hereinafter. Herein, explanation is made especially about the case where the print content index among the print job data to be stored in auxiliary memory as shown in FIG. 2 may be optionally displayed to a user through the display 20 arranged at a printer.

Figure 9:
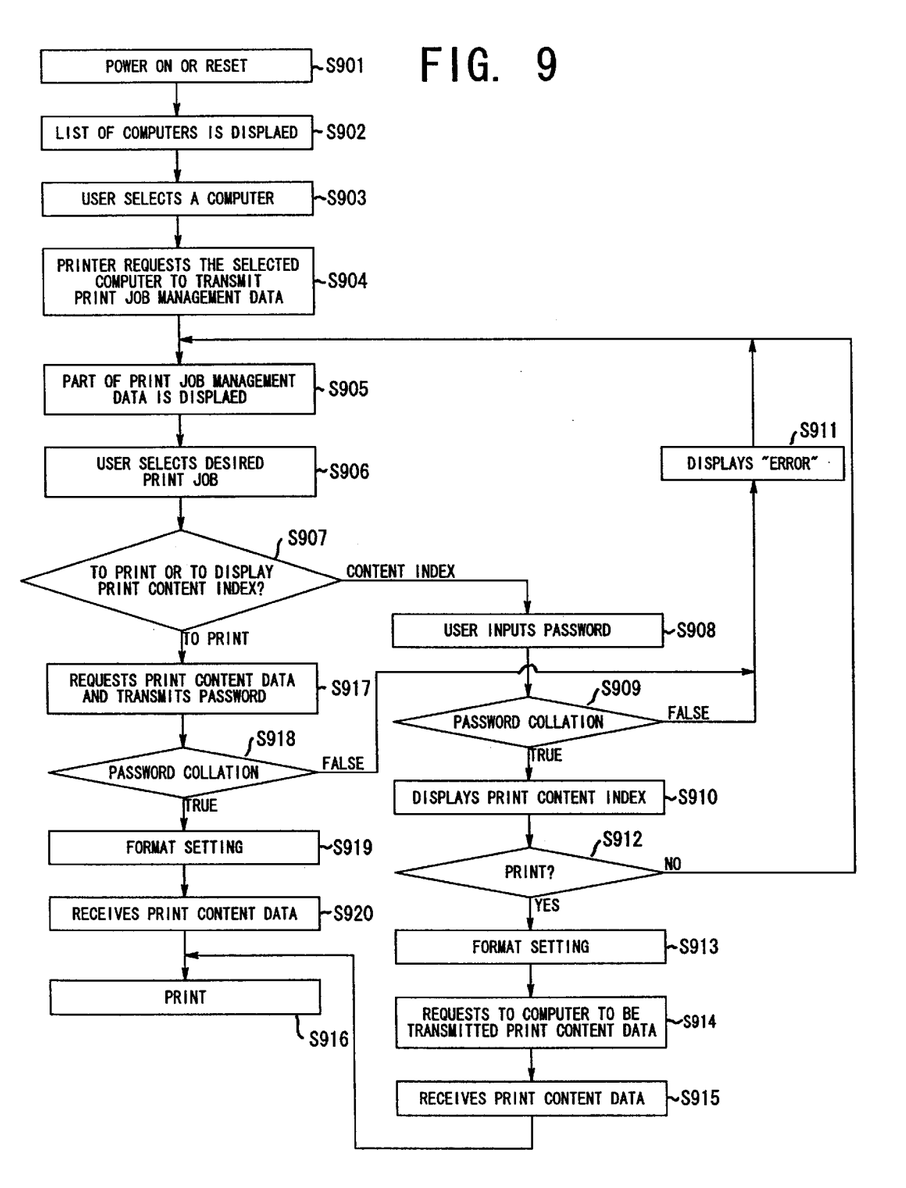
FIG. 9 is a flow chart to explain further other operation processes by print job management program in the network print system in FIG. 1.

FIG. 9 is a flow chart showing operation processes by the print job management data in the case where a user may select one job whether to print out data directly, or to see only print content, or see the print content data and print it out. FIG. 10A to FIG. 10F show the transitions of the display contents illustrating the contents displayed on the screen of the display 20 almost in correspondence to the flow chart in FIG. 9.

Figure 10A:
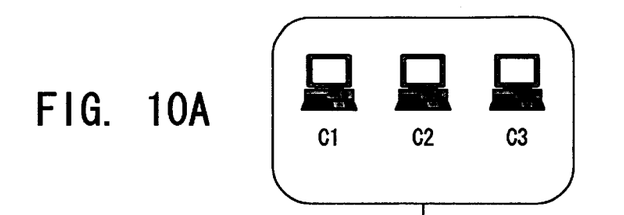
FIG. 10A to FIG. 10F are schematic diagrams showing the transitions of the display contents displayed on the screen of a display almost in correspondence to the flow chart in FIG. 9.

As shown in FIG. 9, the program to control printer on the network N is stored in ROM 14 (FIG. 4). After the system is turned on or reset, this program is transferred to RAM 16 (FIG. 4) and runs (step S901). When a user who has generated a print job on the network N or a user who is given ownership comes to, for example, the printer P2 on the network N, the display 20 of the printer P2 displays that the computers connected to the printer P2 via the network N are C1, C2, and C3 as shown in FIG. 10A (step S902). The user selects, for example, the computer C1 out of the computers C1, C2, and C3 via the input device 22 (step S903).

Figure 10B:
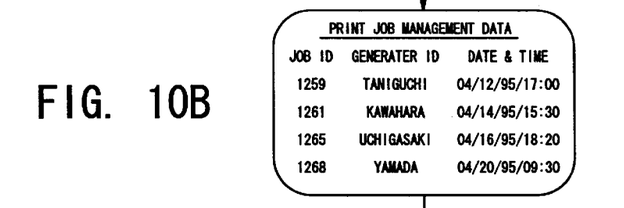

When the computer C1 on the network N is selected by the user, the printer P2 outputs a request signal requesting the computer C1 to transmit the print job management data stored in the auxiliary memory D1 to the printer P2 (step S904). The print job management program of the computer C1, which receives the request signal, transmits the print job management data of all the print jobs that the computer C1 holds to the printer P2 via the network N. The display 20 of the printer P2 which has received the print job management data, as shown in FIG. 10B, displays, for example, job IDs, job generator IDs and job occurrence date and time among the print job management data in the form of a list (step S905).

Figure 10C:
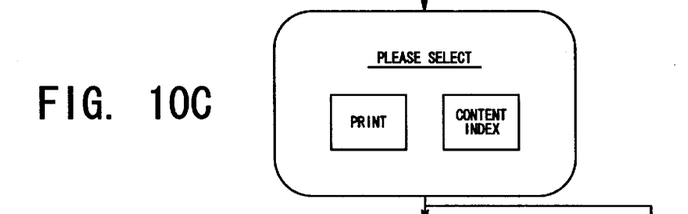

Then, the user selects desired print job via the input device 22 (step S906). Herein, the user may select whether to "PRINT" or to see the "PRINT CONTENT INDEX" as shown in FIG. 10C.

Figure 10D:
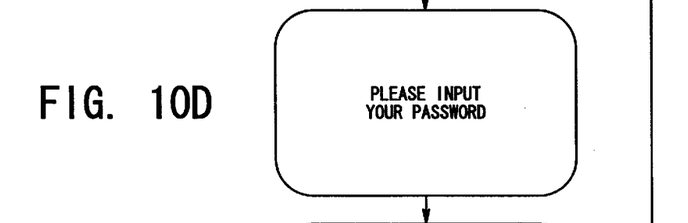
Figure 10E:
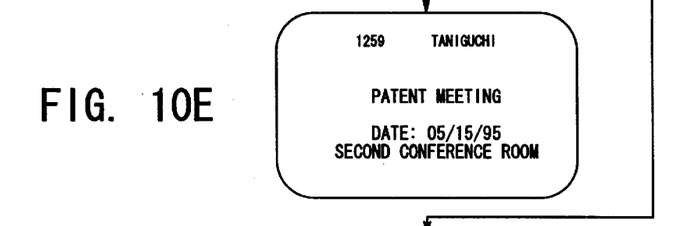

If the user selects "PRINT CONTENT INDEX" ("CONTENT INDEX" in step S907), the printer P2 displays a screen to prompt the user to input his password on the display 20 as shown in FIG. 10D. The user inputs his or her password by use of keyboard of the input device 22 (step S908). The input password is transmitted to the computer C1 which holds the print job, and is collated with the password stored in the computer C1 by this computer C1. In the case where the result of the above collation is correct ("TRUE" in step S909), then the display 20 of the printer P2 displays the print content index of the selected print job as shown in FIG. 10E (step S910). The user may know the details of the print content obtained by the print job management data by looking at this print content index.

In the collation of the step S909, in the case where the result of the collation is not correct, then the display 20 displays "ERROR" indication (step S911), and the processing returns to step S905.

To the user who has seen the print content index in step S910, the display 20 further displays a question whether to print it or not (step S912). If the user does not select "PRINT", then the processing returns to step S905. If the user selects "PRINT", a print format setting screen is displayed on the display 20. The user sets a print format via the input device 22 (step S913). Namely, for example, the user may scale down an image data of size A4 into an image data of size A5, and edit that image data so as to print two images scaled down on a paper sheet of size A4. Or the user may rotate an image to be printed out too. This is made by presetting the data format to be stored in the page memory 28 (FIG. 4).

And then, when the user instructs the printer P2 to start printing operation through the input device 22, the printer P2 transmits to the computer C1 a signal requesting the computer C1 to transmit the print content data to the printer P2 (step S914). In response to this request signal, the computer C1 transmits the print content data and the printer P2 receives that data (step S915). The received print content data is stored into the page memory 28 in accordance with the format set in the step S913. On the basis of this stored data, the content data is printed on paper sheet (step S916).

Figure 10F:
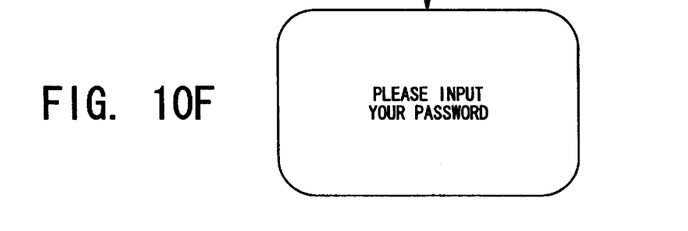

In the step S907, when the user selects "PRINT" ("TO PRINT" in the step S907), the printer P2 displays a screen prompting the user to input his or her password on the display 20 as shown in FIG. 10F. The user inputs his or her password through the keyboard of the input device 22, and the printer P2 transmits to the computer C1 that holds the print job the entered password and a signal requesting the computer C1 to transmit the print content data to the printer P2 (step S917).

The password that has been transmitted to the computer C1 that holds the print job is collated with the password that has been stored in the computer C1 (step S918). In the collation of the step S918, in the case where the result of the collation is not correct, then the display 20 displays "ERROR" indication (step S911), and the processing returns to step S905.

In the case where the result of the above collation is correct, a screen to prompt the user to set a format is displayed on the display 20. When the user sets a format as previously described in the step S913 and instructs the input device 22 to start printing operation, the printer P2 receives the print content data transmitted from the computer C1 in response to the request signal in the step S917 (step S920). The received print content data is stored in the page memory 28 in accordance with the format set in the step S919. On the basis of this stored data, the content data is printed out on paper sheet (step S916).

In this manner, only a specified user authorized by password collation can see the print content index. Thereby, private printed contents and top secret documents can be kept secret. And further, user can first see the print content index and then judge whether to print it or not.

In a network print system according to the present invention, print job has job ownership and job reproduction right. The job ownership may be given to other person than a print job generator too. And the job reproduction right increases in accordance with the number of job owners.

In the present invention, this job ownership may be given to the user itself in plural. In this case, the user does so to obtain plural copies of an identical printed matter. Namely, a certain print job generator may give another job ownership to himself or herself, and in this case, two people own an identical print job though the job owners are identical; therefore, job reproduction right increases to 2 (two).

In this way, this user may obtain plural copies of printed matter from the network print system.

Also, when a printed matter is being output by a printer on the same network, and the same printed matter is to be output by another free printer on the same network, the management of copy number is made by the print job management program on the basis of the number of job reproduction right. Therefore, while job reproduction right is not 0 (zero), it has no problem to print and output print job by any printer on the same network, and also to print and output an identical print job from plural printers at the same time.

Figure 11:
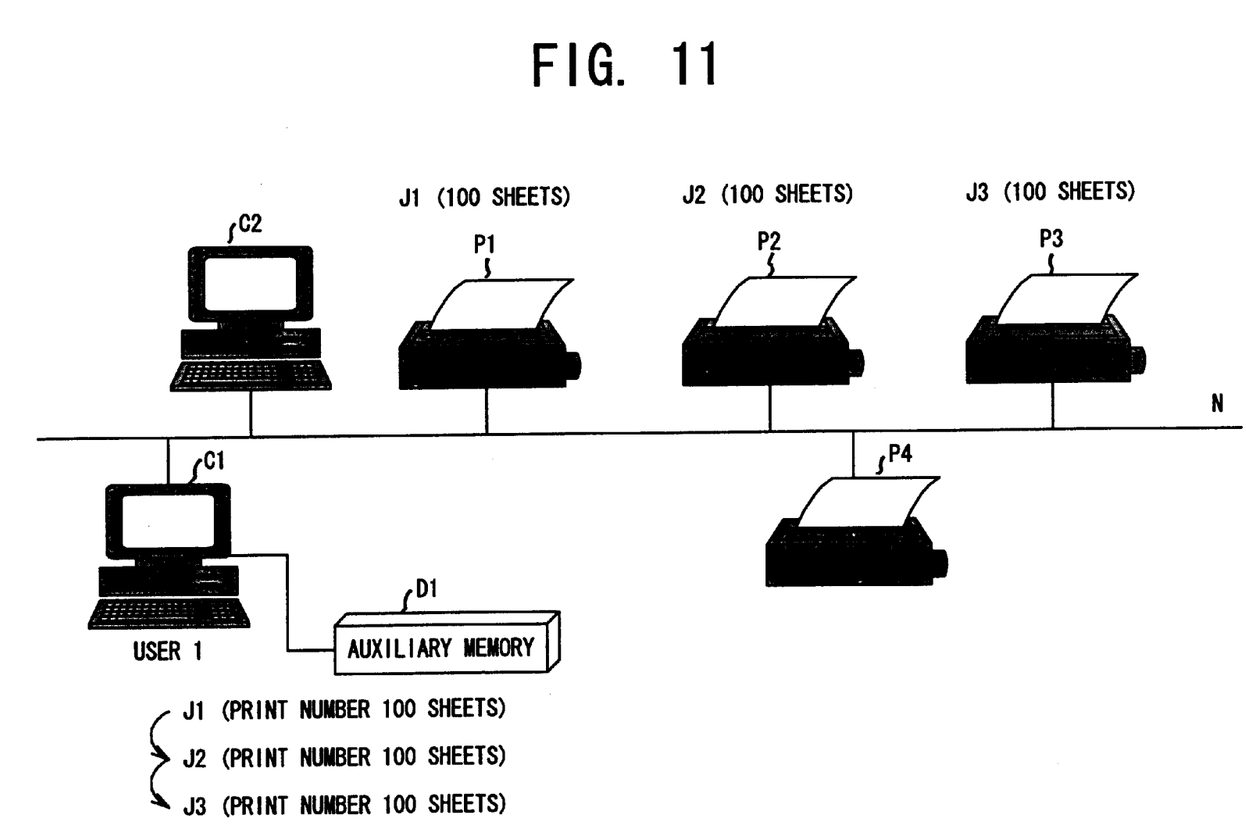
FIG. 11 is a schematic diagram to explain the print processing of plural copies of many sheets of printed matter by use of plural printers on the network.

As shown in FIG. 11, for example, the user 1 may give to the user 1 itself further two reproduction rights of print job J1 as print jobs J2 and J3 in order to output 100 sheets of printed matter. Thereby, the user 1 may obtain 3 copies of 100 sheets of printed matter. That is, the user 1 may execute print job J1 by use of the printer P1, print job J2 by the printer P2, and print job j3 by the printer P3 respectively. The user 1 selects print job J1 at the printer P1, print job J2 at the printer P2, and print job J3 at the printer P3, and outputs 100 sheets of printed matter respectively by the printers P1, P2 and P3 almost at the same time in the same procedures as mentioned previously. Thereby, plural copies of many sheets of printed matter may be output efficiently in a shorter time. Output is available of course by a single unit of printer, however, in this case output must be made in a series of part 1, part 2, and part 3; therefore, it will take much time to output plural copies of many sheets of printed matter. But, as described above, the provision of print job reproduction right to a single user enables to output them at the same time by use of plural units of printer. Accordingly, it is available to output plural copies of many sheets of printed matter in a shorter time; therefore, operation is made far more effective.

As explained above, in accordance with the present invention, user's print waiting time is reduced, mistakes in printing are eliminated, and the secrecy function of printed matter is improved. Further, the present invention enables to provide a network print system where specified plural users can obtain printed matters with identical contents from optional printers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A print method for a network that includes at least one printer and at least one host, comprising:
   a) generating, at a host, print data corresponding to a print job;
   b) temporarily storing the print data at an auxiliary memory of the host;
   c) selecting, by a user at a printer located separate from the host, the host from a listing of the at least one host on a display at the printer;
   d) generating a request for print job management data, based on the selection made in the step c), the request being sent over the network from the printer to the host;
   e) transmitting print job management data, from the host to the printer over the network, where the print job management data does not include the print data itself but includes print job information relating to identifying the print data;
   f) displaying, at the printer, by way of a first input command by the user entered at the printer, respective print management data corresponding to each separate print job currently stored at the auxiliary memory of the host;
   g) selecting, at the printer, by way of a second input command by the user entered at the printer, one print management data corresponding to the print data in the step a);
   h) sending, by the host to the printer, the print data corresponding to the selected print management data in the step f); and
   i) printing, at the printer, the print data received from the host in the step g).

2. A method as claimed in claim 1, further comprising the step of:
   j) deleting print data stored at the auxiliary memory of the host when the print data has been stored at the auxiliary memory for at least a set period of time, regardless of whether or not the print data has been sent to the printer.

3. A method as claimed in claim 1, further comprising the step of:
   j) determining, by the user at the host, m separate reproductions to be made of the print data by the printer, m being a natural number,
   wherein, the print data is maintained at the auxiliary memory of the host until the printer informs the host that all of the m separate reproductions have been performed by the printer.

4. A method as claimed in claim 1, wherein the step b) is performed only when available memory space is currently present in the auxiliary memory for storing the print data generated at the step a), and wherein,
   if there is not enough memory space currently present in the auxiliary memory for storing the print data, the following step is performed:
   j) displaying a message, on a display at the host, that the print data cannot be stored in the temporary memory.

* * * * *